United States Patent
Poetter et al.

(10) Patent No.: US 12,395,492 B2
(45) Date of Patent: Aug. 19, 2025

(54) NETWORK MODEL UTILIZING PROPERTY SETS

(71) Applicant: Unisys Corporation, Blue Bell, PA (US)

(72) Inventors: Jared Poetter, Blue Bell, PA (US); Michael C Leap, Blue Bell, PA (US); Diane E Schaefer, Blue Bell, PA (US); Robert A Johnson, Collegeville, PA (US); Michael Saunders, Blue Bell, PA (US); Robert R Buckwalter, Blue Bell, PA (US); Sarah K Inforzato, Blue Bell, PA (US); Eugene J Gretter, Blue Bell, PA (US); George Karian, Blue Bell, PA (US)

(73) Assignee: Unisys Corporation, Blue Bell, PA (US)

( * ) Notice: Subject to any disclaimer, the term of this patent is extended or adjusted under 35 U.S.C. 154(b) by 0 days.

(21) Appl. No.: 17/386,052

(22) Filed: Jul. 27, 2021

(65) Prior Publication Data
US 2022/0029996 A1    Jan. 27, 2022

Related U.S. Application Data

(60) Provisional application No. 63/056,992, filed on Jul. 27, 2020.

(51) Int. Cl.
*H04L 29/06* (2006.01)
*H04L 9/40* (2022.01)
(Continued)

(52) U.S. Cl.
CPC ........ *H04L 63/104* (2013.01); *H04L 41/0803* (2013.01); *H04L 41/0894* (2022.05);
(Continued)

(58) Field of Classification Search
CPC . H04L 63/0823; H04L 9/3263; H04L 63/105; H04L 63/089
See application file for complete search history.

(56) References Cited

U.S. PATENT DOCUMENTS 6,078,960 A * 6/2000 Ballard ............... H04L 67/1019
709/239
11,606,690 B1   3/2023 Robinson et al.
(Continued)

FOREIGN PATENT DOCUMENTS

JP  2016-503532 A   2/2016
WO  2017/200037 A1  11/2017

OTHER PUBLICATIONS

Final Office Action received for U.S. Appl. No. 17/386,055, mailed on Jan. 3, 2024, 9 pages.
(Continued)

*Primary Examiner* — Dao Q Ho
(74) *Attorney, Agent, or Firm* — Shook, Hardy & Bacon

(57) ABSTRACT

A network model includes nodes, node property sets, authorization groups and authorization servers. The node property sets define how the nodes operate and authenticate. The nodes are member of the node property sets. The authorization groups are associated with the node property set. And, authorization servers are member of the authorization groups. In addition, a network model in a secure network environment has at least one community of interest. The network model includes at least one node being a member of a node property set that defines how the node operates and authenticates.

16 Claims, 11 Drawing Sheets

(51) Int. Cl.
*H04L 41/0803* (2022.01)
*H04L 41/0894* (2022.01)
*H04L 41/12* (2022.01)
*H04L 41/16* (2022.01)
*G06F 9/455* (2018.01)

(52) U.S. Cl.
CPC .............. *H04L 41/12* (2013.01); *H04L 41/16* (2013.01); *H04L 63/0263* (2013.01); *H04L 63/0892* (2013.01); *H04L 63/105* (2013.01); *H04L 63/20* (2013.01); *G06F 9/45558* (2013.01); *G06F 2009/45595* (2013.01)

(56) References Cited

U.S. PATENT DOCUMENTS

| | | | |
|---|---|---|---|
| 2006/0282519 A1 | 12/2006 | Trevathan et al. | |
| 2009/0100261 A1* | 4/2009 | Aoshima | H04L 63/20 709/229 |
| 2011/0154045 A1 | 6/2011 | Lee et al. | |
| 2012/0239431 A1 | 9/2012 | Hayashi | |
| 2012/0278866 A1 | 11/2012 | Huang | |
| 2014/0129835 A1 | 5/2014 | Suryavanshi et al. | |
| 2017/0118087 A1* | 4/2017 | Bergman | G06F 11/3051 |
| 2017/0171208 A1* | 6/2017 | Purushothaman | H04L 63/20 |
| 2017/0374109 A1* | 12/2017 | Atarius | H04L 65/1104 |
| 2018/0191730 A1* | 7/2018 | Deters | H04L 63/105 |
| 2019/0020656 A1* | 1/2019 | Arjun | H04L 69/40 |
| 2020/0177703 A1* | 6/2020 | Panda | H04L 41/12 |
| 2020/0319946 A1* | 10/2020 | Matsuura | G06F 9/5083 |
| 2021/0234705 A1* | 7/2021 | Wesby | H04L 9/321 |
| 2022/0029996 A1* | 1/2022 | Poetter | H04L 41/0843 |

OTHER PUBLICATIONS

Non-Final Office Action received for U.S. Appl. No. 17/386,055, mailed on May 21, 2024, 10 pages.
Non-Final Office Action received for U.S. Appl. No. 17/386,056, mailed on Jan. 3, 2024, 4 pages.

* cited by examiner

| Property set ID | Name | Property settings | Auth Svc Endpoints | Port | Authorization settings | Resource nodes |
|---|---|---|---|---|---|---|
| | | | Sass1 Sass2 | 10400 | Cert + ldap info | |
| | | | Legant Legant | 10410 | cert + ldap info | |
| | | | Sass1 Legant | 10500 | IWA + other | |
| | | | Legant | 10500 | IWA + other | |
| | | | sass1 | 10510 | IWA + other | |

Property settings include: audit, type (sao, cod, etc), tunnel priority, cert name and type
Authorization settings include: auth method + other settings, authservice config info as needed

NETWORK MODEL UTILIZING PROPERTY SETS

FIELD OF THE DISCLOSURE

The present application relates generally to creating secure endpoints on a network. The present application also relates to property sets for endpoints and generic endpoint packages.

BACKGROUND

Robust enterprise security software is complex. The complexity of enterprise security software increases with the level of security required. For example, in enterprise networks in which data must be secured during intra-network storage and/or transmission, detailed definitions regarding a level of security for each user, types of encryption, permissions, and other policies must be set. Because there are often a large number of computing systems within such an enterprise network, provisioning each system can become so complex as to be time- and cost-prohibitive to install such enterprise security software, or at the very least to exploit its full capabilities. Network visualization products enable an administrator, or user, to more easily configure and deploy network security policies in order to protect a network. A user can easily discover endpoints and communications on the network using a live discovery or existing packet capture files to automatically develop network models. Alternatively, a user can create network models from scratch utilizing network visualization products to design new segments or entire networks.

The administrator of a secure network has to describe authorization parameters and the associated authorization servers. Information to guide the endpoint during the period prior to authorization was also described. The packages, which contain both configuration information and software, are manually maintained and mapped to individual servers in the secure network. This results in an administrative burden of manually tracking which server needed which version and ensuring endpoints were running the desired levels of software and configuration. Another drawback to the current implementation is that there are many different packages adding to the administrative burden. Therefore, improvements in the area of change management and deployment are desirable.

SUMMARY

In a first aspect, a network model includes nodes, node property sets, authorization groups and authorization servers. The node property sets define how the nodes operate and authenticate. The nodes are member of the node property sets. The authorization groups are associated with the node property set. And, authorization servers are member of the authorization groups.

In a second aspect, a network model in a secure network environment has at least one community of interest. The network model includes at least one node being a member of a node property set that defines how the node operates and authenticates.

The foregoing has outlined rather broadly the features, technical advantages, and process of the present invention in an order that the detailed description of this invention may be better understood. Additional features and advantages of the invention described hereinafter form the subject of the claims for the invention. It should be appreciated by those skilled in the art that the conception and specific embodiment disclosed may be readily utilized as a basis for modifying or designing other structures for carrying out the same purposes and intentions of the present invention. It should also be realized by those skilled in the art that such equivalent constructions do not depart from the spirit and scope of the invention as set forth in the appended claims. The novel features that are believed to be characteristic of the invention, both as to its organization and method of operation, together with further objects and advantages will be better understood from the following description when considered in connection with the accompanying figures. It is to be expressly understood, however, that each of the figures are provided for the purpose of illustration and description only and is not intended as a definition of the limits of the present invention.

BRIEF DESCRIPTION OF THE FIGURES

For a more complete understanding of the disclosed system and methods, reference is now made to the following descriptions taken in conjunction with the accompanying drawings.

FIG. 7 is an illustration of an endpoint property set configuration information, according to one example embodiment of the present invention;

DETAILED DESCRIPTION

Stealth enterprise security solution from Unisys Corporation of Blue Bell, Pennsylvania can be used to implement features of the present disclosure. Unisys's Stealth Suite includes both Stealth(core) ("Stealth") and Stealth(aware). Stealth reduces attack surfaces in a network environment by creating dynamic, identity-driven microsegments called communities-of-interest. Micro segmentation is a security strategy that segments a network into smaller elements and manages them with IT security policies. By establishing secure community-of-interest, Stealth separates trusted devices, users and data from unknown or untrusted devices. It can further reduce attack surfaces by encrypting all communication between Stealth protected devices and cloaking the devices from unauthorized or unknown users. Micro segmentation divides a physical network into multiple logical micro-segments. Only the resources within the micro segment can see and communicate with one another.

For example, virtual or physical machines executing on one or more servers may each be assigned to one or more communities-of-interest. The communities-of-interest may allow an administrator to create logical organizations of virtual machines. A community-of-interest may be defined by a role performed by the virtual machines in the application stack.

Figure 1:
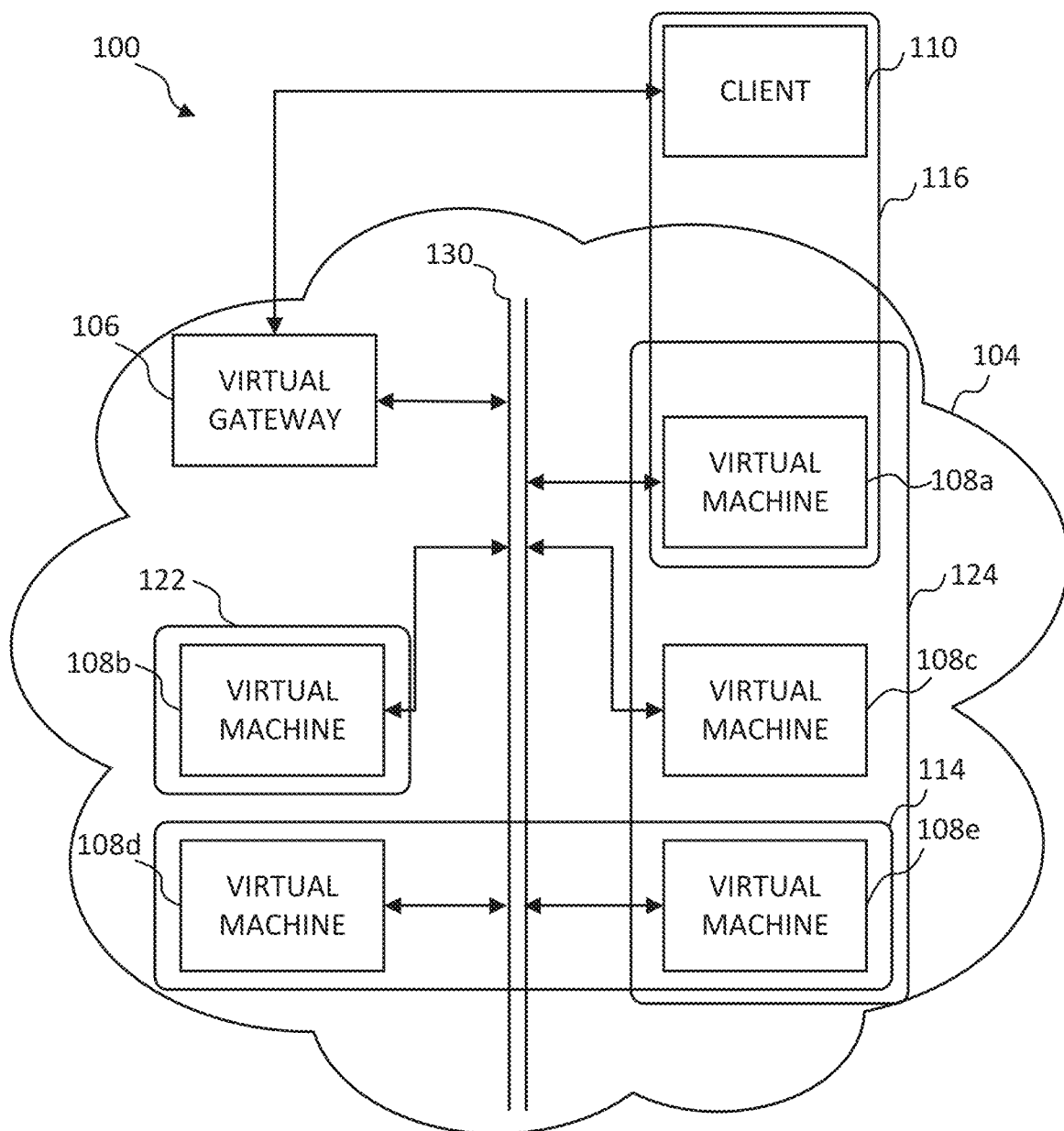
FIG. 1 is a block diagram illustrating an encrypted enclave of virtual machines organized into communities-of-interest, according to one embodiment of the present invention.

Messages or communications within a community-of-interest are encrypted with a key corresponding to the community-of-interest. In this fashion, messages or communications are cryptographically isolated. FIG. 1 is a block diagram illustrating an encrypted enclave of virtual machines organized into communities-of-interest according to one example embodiment of the present disclosure. A network 100 may include a network bus 130 serving an enclave 104. The bus 130 may couple virtual machines 108a-e within the enclave 104. Each of the virtual machines 108a-e may communicate through encrypted communications carried on the bus 130. A virtual gateway 106 may be coupled to the bus 130 to provide communications from the enclave 104 to external devices, such as a client 110 and/or other public networks, such as the Internet. The client 110 may be a remote device, such as a personal computer or mobile device. The client 110 may be connected to the virtual gateway 106 through a secured tunnel, such that the communications between the client 110 and the virtual gateway 106 are encrypted similar to the encrypted communications on the bus 130.

The virtual machines 108a-e may be assigned to one or more communities-of-interest. For example, the virtual machines 108a, 108c, and 108e may be assigned to community-of-interest 124. Virtual machines 108d and 108e may be assigned to community-of-interest 114. And, virtual machine 108b may be assigned to community-of-interest 122. And, the virtual machine 108a and the client 110 may be assigned community-of-interest 116.

A virtual machine 108e may be instructed to transmit a message, or data, to the virtual machine 108a. For example, software executing on the virtual machine 108e may request data from a database server hosted on the virtual machine 108d. When the virtual machine 108e receives the message destined for the virtual machine 108a, the virtual machine 108e may identify a community-of-interest in common between virtual machine 108e and virtual machine 108a. The community-of-interest 124 may be identified and a key associated with community-of-interest 124 may be used to encrypt the message.

Figure 2:
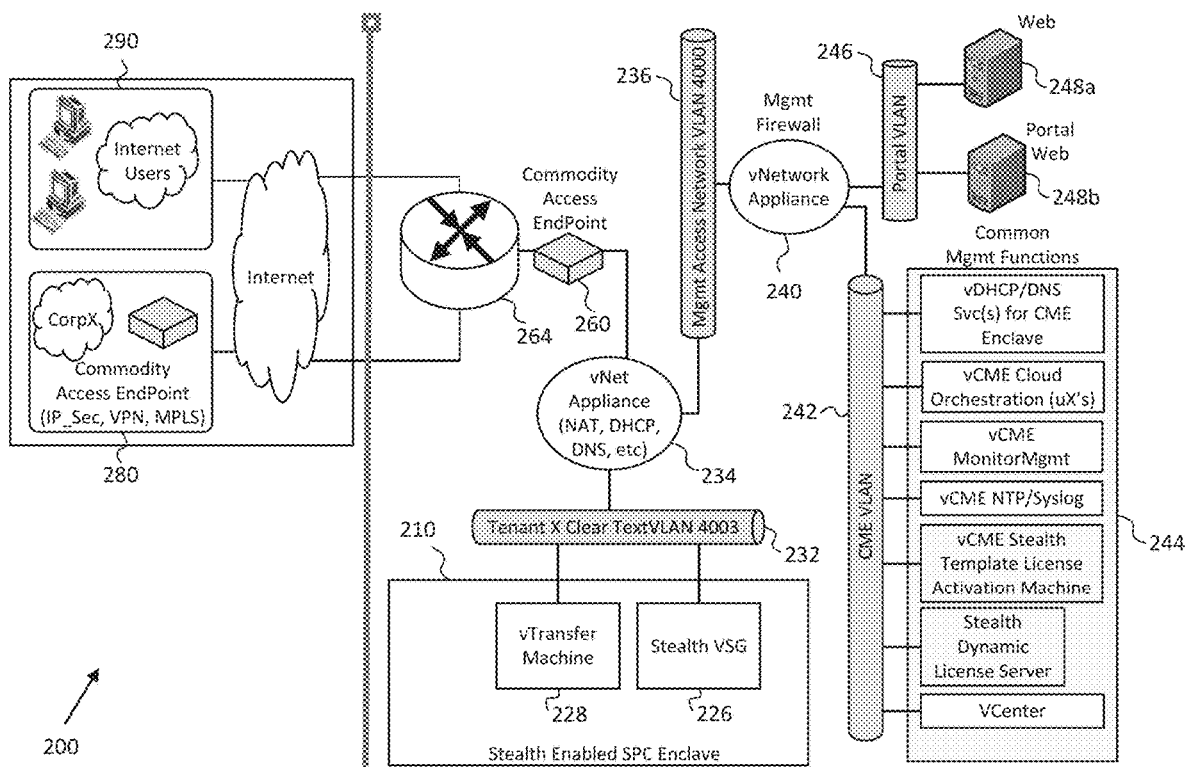
FIG. 2 is a is a block diagram illustrating a network implementing communities-of-interest, according to one embodiment of the present invention.
Figure 3:
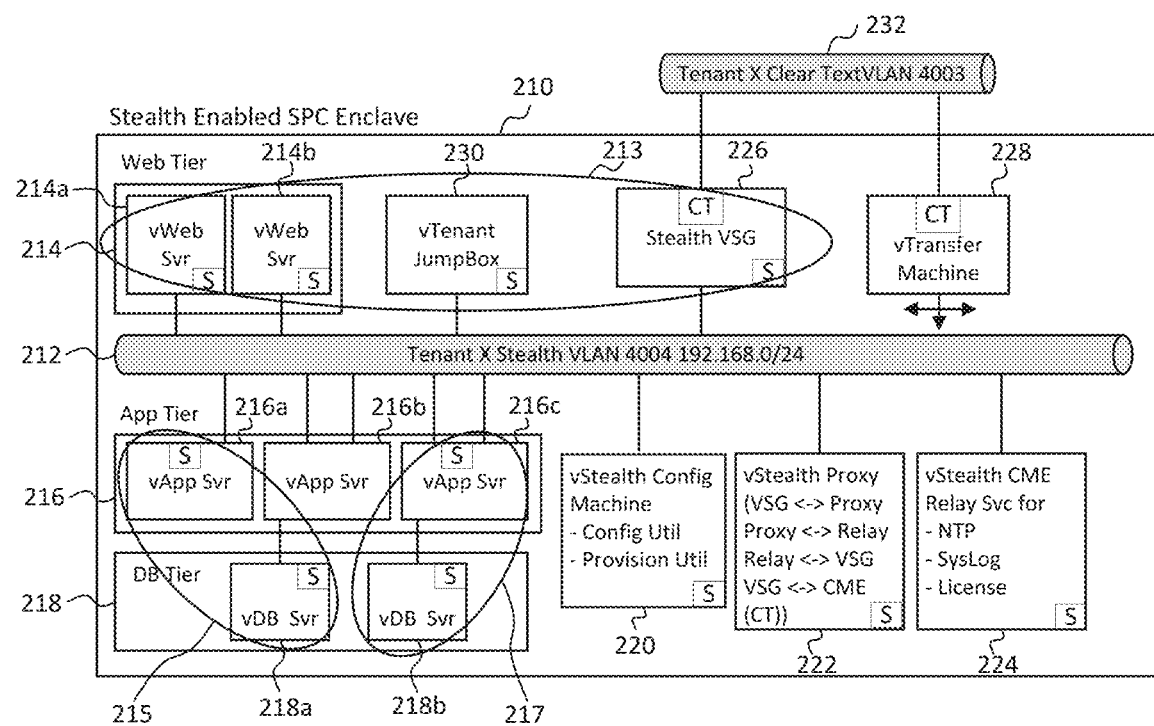
FIG. 3 is a block diagram illustrating an enclave included in the network of FIG. 2.

The community-of-interest organization of virtual machines may be implemented in a computer network to provide cryptographic isolation of virtual machines. FIGS. 2 and 3 are block diagrams illustrating a network implementing communities-of-interest according to one embodiment of the disclosure. A network 200 may include an enclave 210. According to one embodiment, the enclave 210 may belong to a single tenant of the network 200. In other embodiments, the enclave 210 may be shared between tenants.

Communities-of-interest may be configured for a web tier 214, an application tier 216, and a database tier 218. The web tier 214 may include a number of web servers 214a-b, the application tier 216 may include a number of application servers 216a-c, and the database tier 218 may include a number of database servers 218a-b. Each of the servers 214a-b, 216a-c, and 218a-b may be a virtual server executing within a virtual machine. Additional communities-of-interest may be defined for infrastructure functions, such as administrative, proxy, application tier management, database tier management, or a jumpbox management. The enclave 210 may also include a jumpbox 230, a transfer machine 228, a virtual gateway 226, a relay 224, a proxy 222, and a configuration device 220, which may also be executing in virtual machines.

Membership of the virtual machines in individual communities-of-interest are shown as numbered circles 213, 215, 217. For example, a community-of-interest 213 may include the servers 214a-b, the jumpbox 230 and virtual gateway 226. According to one embodiment, only virtual machines that share a common community-of-interest may communicate. When the first virtual machine initiates communication with the second virtual machine, the first virtual machine may search for a common community-of-interest between the first and the second virtual machine. If found, a cryptographic session key may be created that is encrypted with a key associated to the common community-of-interest. Thus, only a virtual machine that shares the community-of-interest key may decrypt the session key. All communication between the two virtual machines may be encrypted and decrypted with the session key. Messages within the enclave 210 may be isolated from the rest of the network 200, because the messages are encrypted with keys that are not available to the rest of the network 200.

For example, a web server virtual machine 214a may be able to communicate with another web server virtual machine 214b, because the virtual machines 214a-b have the community-of-interest 213 in common. They cannot communicate with the DB tier since the machines 218a-b do not have a community-of-interest in common with the virtual machines 214a-b.

Each of the devices within the enclave 210 may be coupled to a bus 212. When a device within the enclave 210 communicates with devices outside the enclave 210, then messages may be handled by the virtual gateway 226, which may be coupled to an unencrypted network 232. According to one embodiment, the virtual gateway 226, such as a Stealth Gateway, may encrypt and/or decrypt messages between the enclave 210 and the unencrypted network 232. The network 232 may couple the enclave 210 to other network appliances 234, such as network address translation (NAT) devices, dynamic host control protocol (DHCP) devices, domain name service (DNS) devices, and the like. The other network appliances 234 may also be executing in virtual machines.

Access to the enclave 210 may be controlled by the virtual gateway 226. Messages passing through the gateway 226 from the unencrypted, or clear-text, network 232 to the enclave 210 may be encrypted and messages in the other direction may be decrypted by the gateway 226. According to one embodiment, messages within the enclave 210 may only be transmitted to a virtual machine that has a community-of-interest in common with the gateway 226. Furthermore, the gateway 226 may be configured to filter messages for a community-of-interest. The filter may allow an administrator to restrict access based on a message's source and/or destination address and/or port. The enclave 210 may also be isolated from other enclaves (not shown) in the network 200, because only a virtual machine having a common community-of-interest with the gateway 226 may communicate outside of the enclave 210.

For example, the web servers 214a-b may be able to communicate through the gateway 226, because the web servers 214a-b share the community-of-interest 213 with the gateway 226. In another example, the application servers 216a-c and the database servers 218a-b may have restricted access through the gateway 226, because the gateway 226 may filter messages transmitted in the application community-of-interest and the database community-of-interest to only provide access from management devices 244.

Productivity and innovation require access to IT services on-premises and in the cloud, from any device, in any location globally. Traditional security perimeters are dissolving, increasing the network complexity and making it difficult to keep track of all the activity, especially in regards to security. Stealth(aware) is a network visualization product that enables a user to easily configure and deploy network security policies in order to protect the network. Stealth (aware) allows a user to visually discover endpoints and traffic on the network, as well as communications, using live discovery or existing packet capture files. Additionally, Stealth(aware) enables a user to create new network models from scratch to visualize new environments.

To simplify network complexity, Stealth(aware) automatically groups devices, or Nodes, into Profiles that have similar traffic patterns. Granularity levels are adjusted to balance simplicity and details. With a single click, a network model can be transformed into a model of micro segmentation policies. Stealth(aware) keeps the network view current by refreshing network model to identify policy violations or unwanted and suspicious communications between Nodes. It then allows the network administrator to quickly create and update network security polices to isolate the Node or block the suspicious communication.

In Stealth(aware), when a Project is initially created, a set of predefined Solutions, Profiles, Channels and Flows are automatically created for the user to help with the initial set up of a Stealth Environment. As part of creating these pre-defined objects, a Stealth recommended configuration is provided for the user in order to have a functioning Stealth environment as quickly as possible. Secure endpoint or nodes must also be created.

Figure 4:
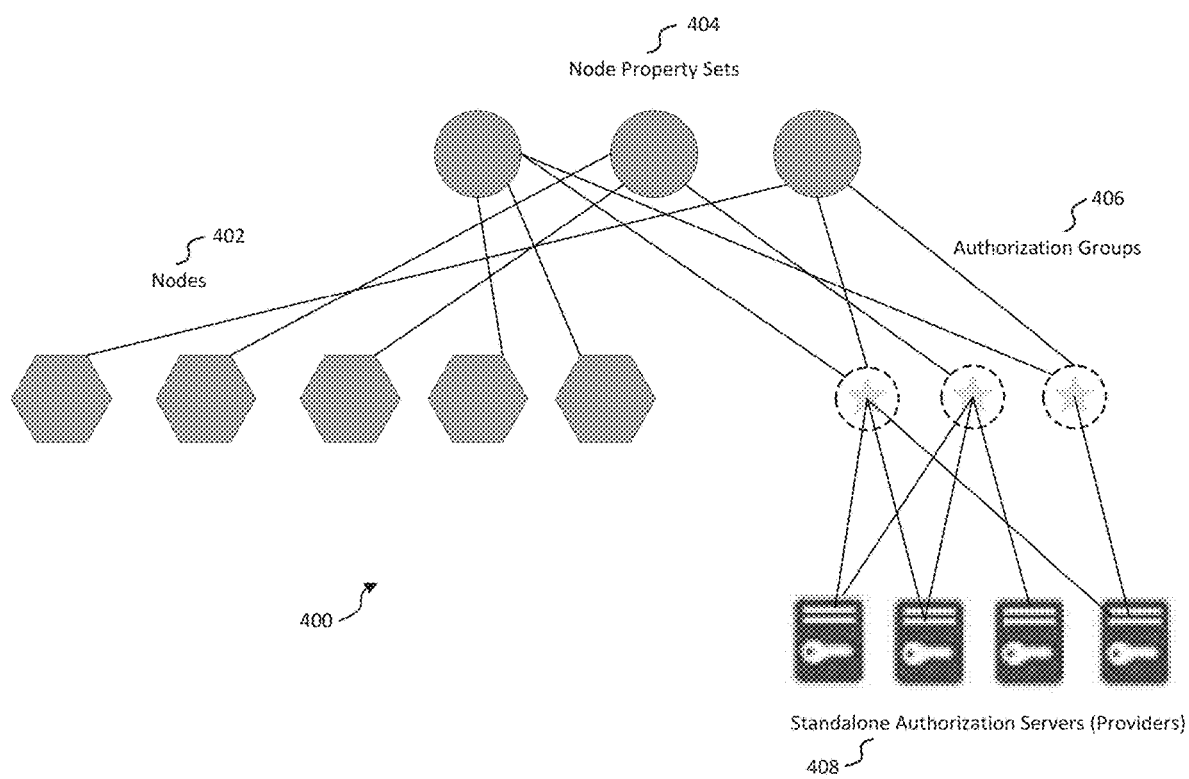
FIG. 4 is an illustration of a property set, according to one example embodiment of the present invention.

Stealth(aware) has Property Sets, which is an object associated with nodes that defines who the node authenticates to and how that node operates. Referring to FIG. 4, the concept of Property Sets 400 is illustrated. Property Sets 400 includes nodes 402 (also referred to as endpoints), node property sets 404, authorization groups 406 and authorization servers 408. Nodes 402 are members of a node property set 404; node property sets 404 are associated with one or more authorization groups 406; and authorization groups 406 contain one or more standalone authorization servers 408. An authorization group 406 can be associated with one or more node property sets 404, and authorization servers 408 can be members of one or more authorization groups 406.

Figure 5:
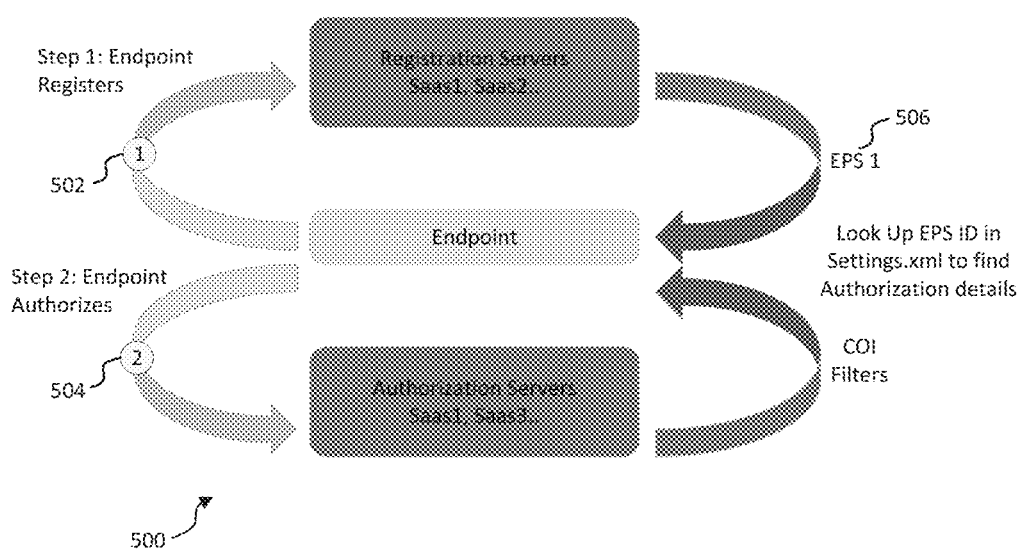
FIG. 5 is an illustration of registration and authorization, according to one example embodiment of the present invention.

Referring to FIG. 5, a node 402 must perform registration 502 before authorization 504. The node 402 applies a random selection algorithm to choose which authorization server 408 to register to. Once registered, the node 402 receives an endpoint property set ID 506 to get authorized. The endpoint property set ID 506 allows the node 402 to look up its authorization details in a setting file such that it can authorize 504.

A user can set the Property Set 400 at a Project level (automatically done when the Project is created), at a Solution level (where are member nodes of that Solution are associated with the selected Property Set), at a Profile level (where all member Nodes of that Profile are associated with the selected Property Set) and at a Node level. Property Sets can includes a registration server, Stealth Management Server, Standalone Authorization Server or Default IWA Property Set. Property Set membership uses an inheritance/hierarchy concept. The Project level value is set to a default IWA Property Set. Solutions inherit from the Project level; Profiles inherit from the Solution level; and Nodes inherit from the Profile level. A user can then change the parameters of any given Property Set 400.

Property Sets 400 abstract the actual Authorization Servers from the network administrator. This enables the Property Sets 400 to be created based on a functional, location or other basis as determined by the network administrator. The user can create, edit, display and delete node property sets 404 and their related fields. The user also creates node property sets 404 for both registration 502 and authorization 504.

Previously, a user would describe the authorization parameters and the associated authorization servers. Information to guide the node during the authorization was also described. The packages, which contain both configuration information and software were manually maintained and mapped to individual servers.

Figure 6:
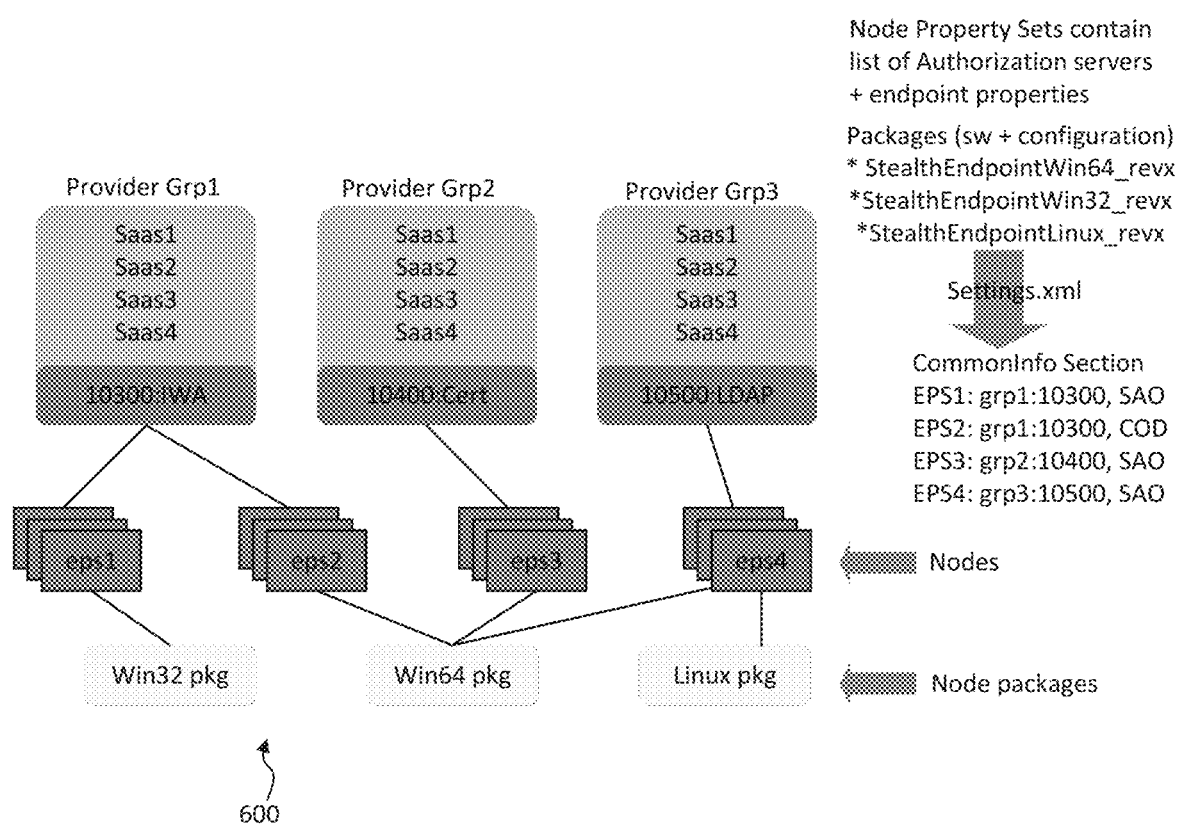
FIG. 6 is an illustration of generic endpoint packages, according to one example embodiment of the present invention.

In this disclosure, the configuration information is consolidated into a single standard configuration, referred to as generic node configuration, which can be used by all nodes 402. Regardless of Operating System type, the configuration is the same and automatically managed by the software. This greatly reduces the burden of management and distribution of endpoint packages. Referring to FIG. 6, a generic endpoint package 600 is illustrated. This generic endpoint package 600 is a consolidation of configuration information into a single standard configuration, which can be used by all endpoints. The configuration is applied to each supported software, such as Linux, Windows 32 bit systems and Windows 64 bit systems. Regardless of the OS type, the configuration is the same and automatically managed by the Stealth software. The node configuration is divided into three main sections: node property sets 402, common-information and registration. The node property sets 402 contain all the authorization information that is used by a particular node 402. The administrator may define one or more property sets depending on network complexity and needs of the enterprise.

A random hunting algorithm is used such that various nodes 402 start the attempt to authorize at a different place in the list. This provides load balancing of the authorization of nodes 402 between multiple authorization servers 408 without having to define multiple ordered lists to accomplish this. The randomization of this list makes the consolidation of the node package even more generic. A mapping table is maintained by the software where each node is mapped to a node property set 404 as defined by the user.

The common-info section contains the rules to apply to nodes 402 while in service mode and prior to authorization. These rules govern the communication to other Stealth enabled nodes. The registration section includes information to direct the node 402 to pre-defined registration servers as defined by the user. In order for a node to successfully authorize and join the secure network, it must first contact the registration server where its identity is mapped to a property set. Once the property set is known by the node, it can attempt authorization as defined by the generic endpoint configuration.

Updates are sent by node property sets 404 to the nodes 402 that are mapped to them automatically. As the user makes changes, a new version of the node package is generated and distributed as directed by the user. This greatly reduces the burden of managing and creating node packages by the user.

Figure 8:
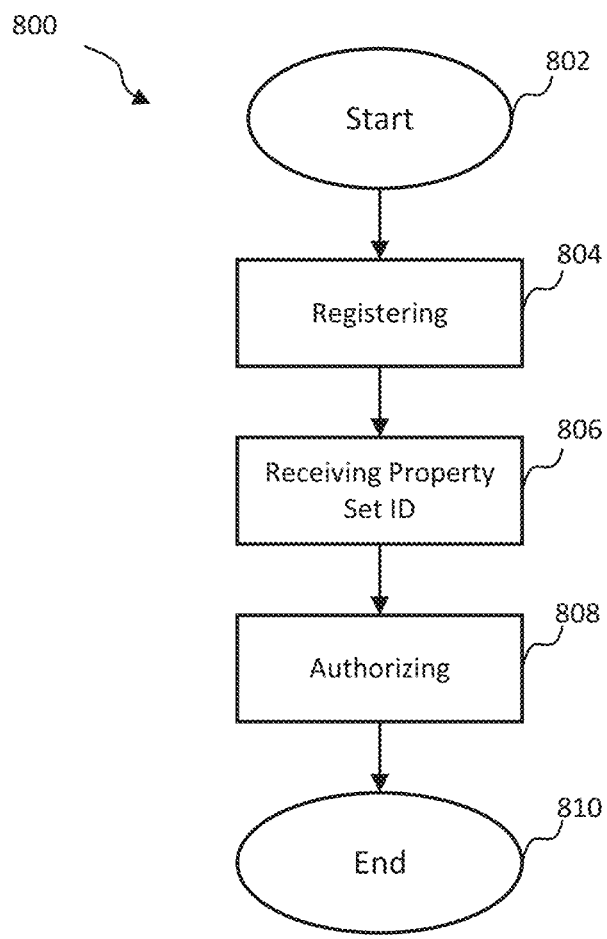
FIG. 8 is a flow diagram of a method, according to one example embodiment of the present invention.

FIG. 7 illustrates a node property set's information 700. Referring to FIG. 8, a method 800 of creating secure endpoint on a network is illustrated. The method begins at 802. At 804, a node registers using a random selection algorithm to choose which server to register to. At 806, the node receives a property set ID. At 808, the node authorizes using the property set ID to look up it authorization information. The method ends at 810.

Figure 9:
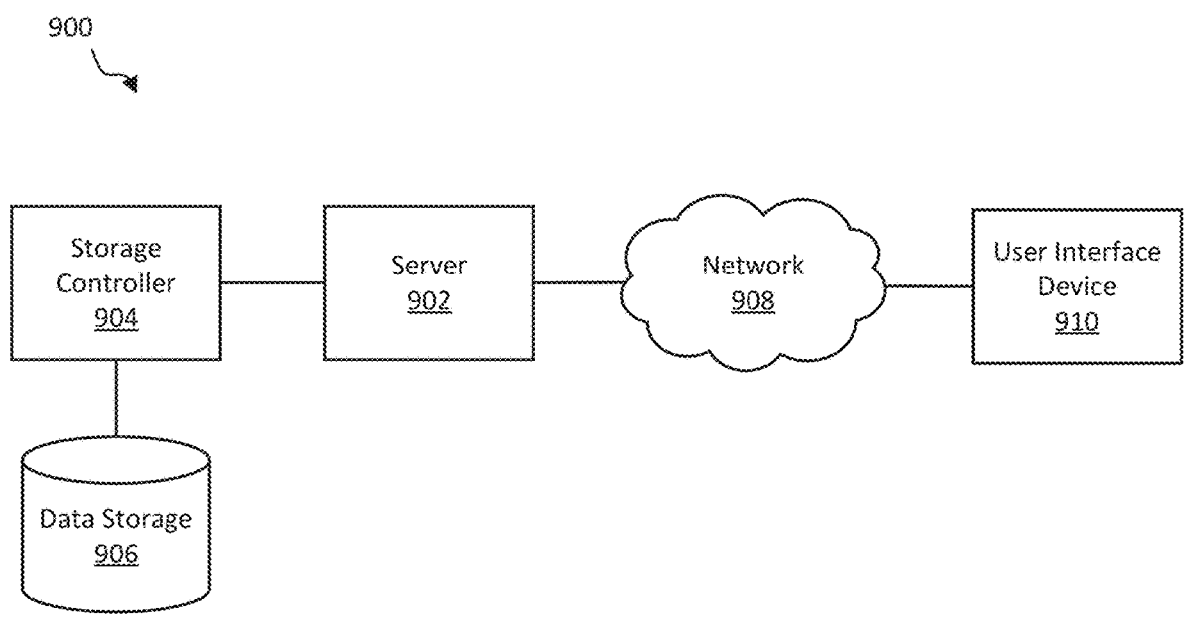
FIG. 9 is a block diagram illustrating a computer network, according to one example embodiment of the present invention.

FIG. 9 illustrates one embodiment of a system 900 for an information system, which may host virtual machines. The system 900 may include a server 902, a data storage device 906, a network 908, and a user interface device 910. The server 902 may be a dedicated server or one server in a cloud computing system. The server 902 may also be a hypervisor-based system executing one or more guest partitions. The user interface device 910 may be, for example, a mobile device operated by a tenant administrator. In a further embodiment, the system 900 may include a storage controller 904, or storage server configured to manage data communications between the data storage device 906 and the server 902 or other components in communication with the network 908. In an alternative embodiment, the storage controller 904 may be coupled to the network 908.

In one embodiment, the user interface device 910 is referred to broadly and is intended to encompass a suitable processor-based device such as a desktop computer, a laptop computer, a personal digital assistant (PDA) or tablet computer, a smartphone or other a mobile communication device having access to the network 908. The user interface device 910 may be used to access a web service executing on the server 902. When the device 910 is a mobile device, sensors (not shown), such as a camera or accelerometer, may be embedded in the device 910. When the device 910 is a desktop computer the sensors may be embedded in an attachment (not shown) to the device 910. In a further embodiment, the user interface device 910 may access the Internet or other wide area or local area network to access a web application or web service hosted by the server 902 and provide a user interface for enabling a user to enter or receive information.

The network 908 may facilitate communications of data, such as dynamic license request messages, between the server 902 and the user interface device 910. The network 908 may include any type of communications network including, but not limited to, a direct PC-to-PC connection, a local area network (LAN), a wide area network (WAN), a modem-to-modem connection, the Internet, a combination of the above, or any other communications network now known or later developed within the networking arts which permits two or more computers to communicate.

In one embodiment, the user interface device 910 accesses the server 902 through an intermediate sever (not shown). For example, in a cloud application the user interface device 910 may access an application server. The application server may fulfill requests from the user interface device 910 by accessing a database management system (DBMS). In this embodiment, the user interface device 910 may be a computer or phone executing a Java application making requests to a JBOSS server executing on a Linux server, which fulfills the requests by accessing a relational database management system (RDMS) on a mainframe server.

Figure 10:
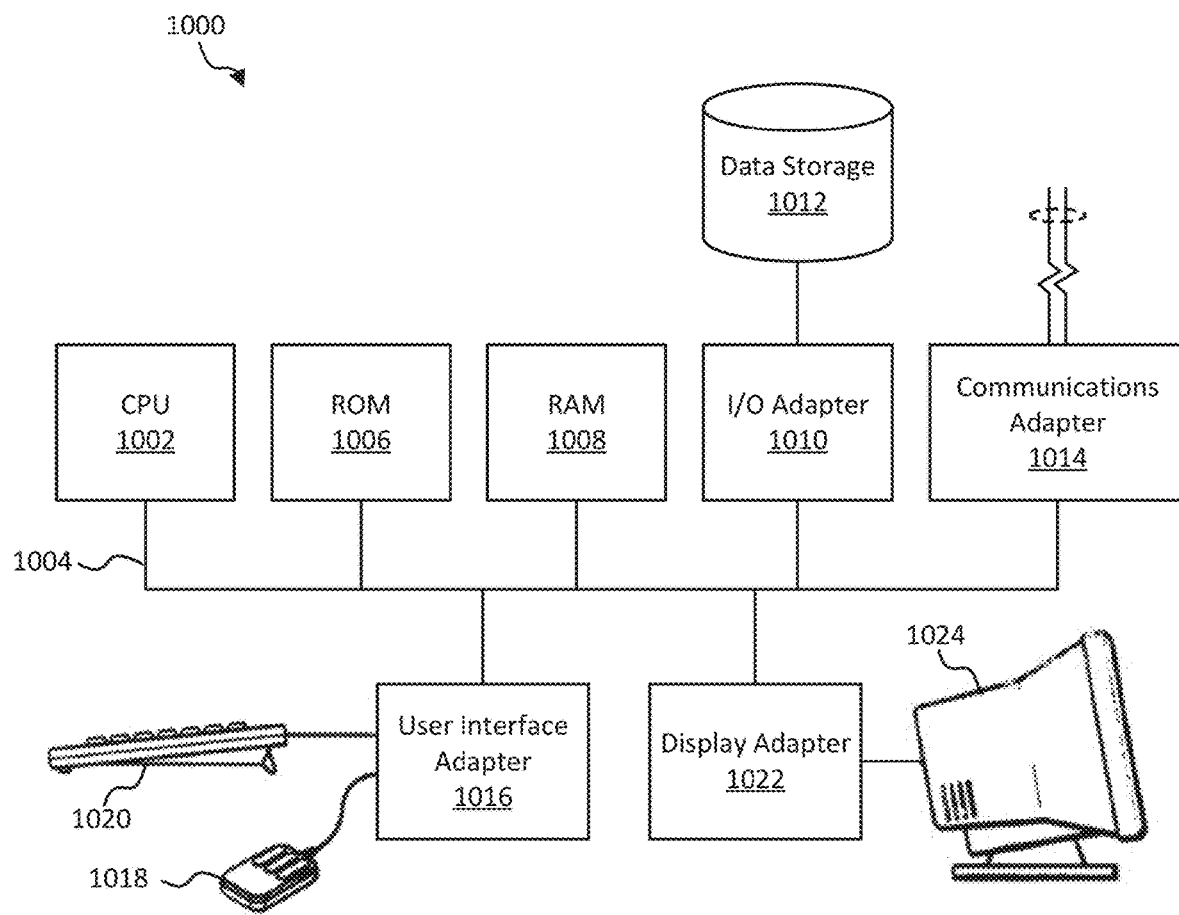
FIG. 10 is a block diagram illustrating a computer system, according to one example embodiment of the present invention.

FIG. 10 illustrates a computer system 1000 adapted according to certain embodiments of the server 902 and/or the user interface device 910. The central processing unit ("CPU") 1002 is coupled to the system bus 1004. The CPU 1002 may be a general purpose CPU or microprocessor, graphics processing unit ("GPU"), and/or microcontroller. The present embodiments are not restricted by the architecture of the CPU 1002 so long as the CPU 1002, whether directly or indirectly, supports the operations as described herein. The CPU 1002 may execute the various logical instructions according to the present embodiments.

The computer system 1000 also may include random access memory (RAM) 1008, which may be synchronous RAM (SRAM), dynamic RAM (DRAM), synchronous dynamic RAM (SDRAM), or the like. The computer system 1000 may utilize RAM 1008 to store the various data structures used by a software application. The computer system 1000 may also include read only memory (ROM) 1006 which may be PROM, EPROM, EEPROM, optical storage, or the like. The ROM may store configuration information for booting the computer system 1000. The RAM 1008 and the ROM 1006 hold user and system data, and both the RAM 1008 and the ROM 1006 may be randomly accessed.

The computer system 1000 may also include an input/output (I/O) adapter 1010, a communications adapter 1014, a user interface adapter 1016, and a display adapter 1022. The I/O adapter 1010 and/or the user interface adapter 1016 may, in certain embodiments, enable a user to interact with the computer system 1000. In a further embodiment, the display adapter 1022 may display a graphical user interface (GUI) associated with a software or web-based application on a display device 1024, such as a monitor or touch screen.

The I/O adapter 1010 may couple one or more storage devices 1012, such as one or more of a hard drive, a solid state storage device, a flash drive, a compact disc (CD) drive, a floppy disk drive, and a tape drive, to the computer system 1000. According to one embodiment, the data storage 1012 may be a separate server coupled to the computer system 1000 through a network connection to the I/O adapter 1010. The communications adapter 1014 may be adapted to couple the computer system 1000 to the network 908, which may be one or more of a LAN, WAN, and/or the Internet. The communications adapter 1014 may also be adapted to couple the computer system 1000 to other networks such as a global positioning system (GPS) or a Bluetooth network. The user interface adapter 1016 couples user input devices, such as a keyboard 1020, a pointing device 1018, and/or a touch screen (not shown) to the computer system 1000. The keyboard 1020 may be an on-screen keyboard displayed on a touch panel. Additional devices (not shown) such as a camera, microphone, video camera, accelerometer, compass, and or gyroscope may be coupled to the user interface adapter 1016. The display adapter 1022 may be driven by the CPU 1002 to control the display on the display device 1024. Any of the devices 1002-1022 may be physical and/or logical.

The applications of the present disclosure are not limited to the architecture of computer system 1000. Rather the computer system 1000 is provided as an example of one type of computing device that may be adapted to perform the functions of a server 902 and/or the user interface device 910. For example, any suitable processor-based device may be utilized including, without limitation, personal data assistants (PDAs), tablet computers, smartphones, computer game consoles, and multi-processor servers. Moreover, the systems and methods of the present disclosure may be implemented on application specific integrated circuits (ASIC), very large scale integrated (VLSI) circuits, or other circuitry. In fact, persons of ordinary skill in the art may utilize any number of suitable structures capable of executing logical operations according to the described embodiments. For example, the computer system 1000 may be virtualized for access by multiple users and/or applications.

Figure 11A:
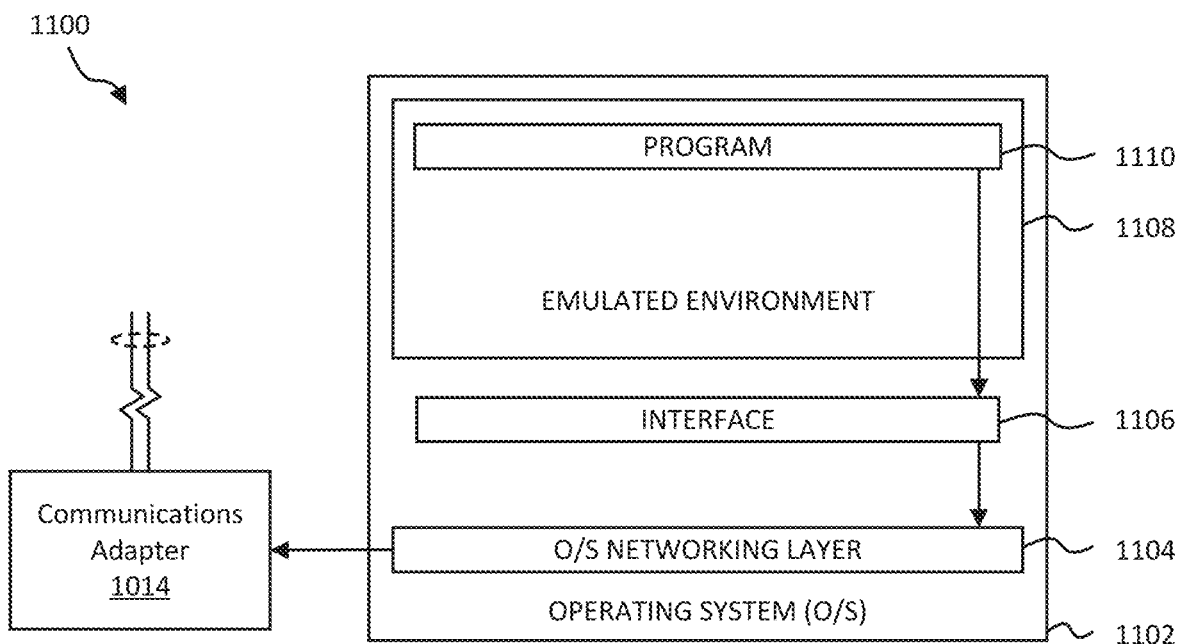
FIG. 11A is a block diagram illustrating a server hosting an emulated software environment for virtualization, according to one example embodiment of the present invention.

FIG. 11A is a block diagram illustrating a server hosting an emulated software environment for virtualization according to one embodiment of the disclosure. An operating system 1102 executing on a server includes drivers for accessing hardware components, such as a networking layer 1104 for accessing the communications adapter 1014. The operating system 1102 may be, for example, Linux. An emulated environment 1108 in the operating system 1102 executes a program 1110, such as CPCommOS. The program 1110 accesses the networking layer 1104 of the operating system 1102 through a non-emulated interface 1106, such as XNIOP. The non-emulated interface 1106 translates requests from the program 1110 executing in the emulated environment 1108 for the networking layer 1104 of the operating system 1102.

Figure 11B:
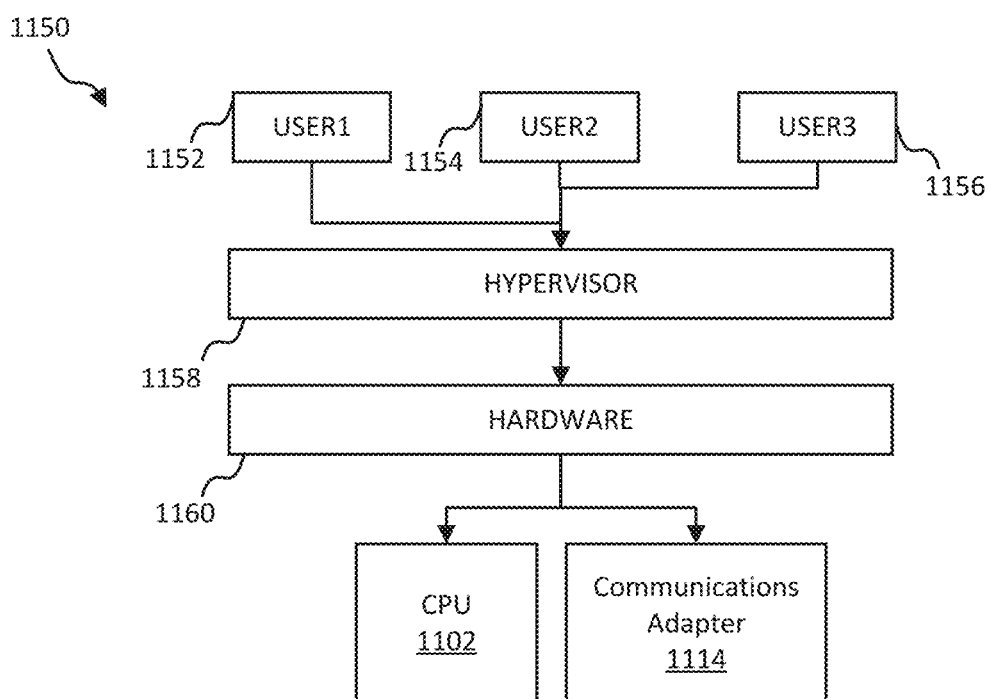
FIG. 11B is a block diagram illustrating a server hosting an emulated hardware environment, according to one example embodiment of the present invention.

In another example, hardware in a computer system may be virtualized through a hypervisor. FIG. 11B is a block diagram illustrating a server hosting an emulated hardware environment according to one embodiment of the disclosure. Users 1152, 1154, 1156 may access the hardware 1160 through a hypervisor 1158. The hypervisor 1158 may be integrated with the hardware 1160 to provide virtualization of the hardware 1160 without an operating system, such as in the configuration illustrated in FIG. 11A. The hypervisor 1158 may provide access to the hardware 1160, including the CPU 1002 and the communications adaptor 1014.

If implemented in firmware and/or software, the functions described above may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc includes compact discs (CD), laser discs, optical discs, digital versatile discs (DVD), floppy disks and blu-ray discs. Generally, disks reproduce data magnetically, and discs reproduce data optically. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the present invention, disclosure, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

We claim:

1. A network model comprising:
   node property sets that include nodes and define how nodes operate and authenticate, wherein the node property sets contain a list of authorization servers and node properties;
   authorization groups that contain authentication servers associated with the node property sets;
   authorization servers that is a combination of hardware and software, which are members of the authorization groups;
   nodes, which are devices including endpoints and are members of the node property sets, authorize as secure nodes in the network by registering to a registration server and receiving a node property set ID, performing a random selection algorithm based on a node configuration of the nodes to choose an authorization server from the list of authorization servers contained in the node property set that includes the nodes and define how the nodes operate and authenticate to provide-authorization of the node, using the node property set ID to access authorization information from the node property set associated with the node property set ID and authorize using the authorization information associated with the node property set ID, wherein the random selection algorithm causes each node to authorize at a randomly selected authorization server based on the random selection algorithm performed by the node.

2. The model according to claim 1, wherein updates are provided to the node property sets, which are mapped to the nodes automatically.

3. The model according to claim 1, wherein authorization groups can be associated with more than one property set.

4. The model according to claim 3, wherein authorization servers can be member of more than one authorization group.

5. The model according to claim 1, wherein a node's membership in a property set uses an inheritance or hierarchy concept.

6. The model according to claim 1, wherein the node properties include audit, type, tunnel priority, cert name and type.

7. The model according to claim 1, wherein the nodes are members of at least one community of interest in a secure network environment.

8. A network model in a secure network environment having at least one community of interest, the network model comprising:
    at least one node that is a device including an endpoint being a member of a node property set that includes nodes and defines how the at least one node operates and authenticates; and the node registering to a registration server and receiving a node property set ID, applying a random selection algorithm based on a node configuration of the nodes to choose which authentication server that is a combination of hardware and software from a list of authorization servers contained in the node property set that includes the nodes and define how the nodes operate and authenticate to provide authorization of the node, use the node property set ID to access authorization information from the node property set associated with the node property set ID and authorize using the authorization information associated with the node property set ID, wherein the random selection algorithm causes each node to authorize at a randomly selected authorization server based on the random selection algorithm performed by the node, and wherein the node property sets contain the list of authorization servers and node properties.

9. The network model of claim 8, wherein the node inherits rules on how the node operates from the property set and instructions on how to authenticate.

10. The network model of claim 9, wherein updates to the property set automatically promulgate to the node.

11. The network model of claim 10, further comprising:
    at least one authorization group associated with the node property set; and
    at least one authorization server, which is a member of the authorization group.

12. The network model of claim 11, wherein the at least one authorization group can be associated with more than one property set.

13. The network model of claim 12, wherein the at least one authorization server can be associated with more than one authorization group.

14. The network model of claim 13, wherein the at least one node is a member of the at least one community of interest.

15. The network model of claim 14, wherein the at least one node is a member of more than one community of interest.

16. The network model of claim 15, wherein the at least one authentication server is a member of the at least one community of interest.

* * * * *